US012701095B2

(12) United States Patent
Hathaway et al.

(10) Patent No.: US 12,701,095 B2
(45) Date of Patent: Aug. 4, 2026

(54) COMPUTERIZED SYSTEM FOR DYNAMIC IMAGE INCLUSION IN AN ELECTRONIC MESSAGE

(71) Applicant: Virtual Connect Technologies, Inc., Greenville, SC (US)

(72) Inventors: Benjamin Hathaway, Greenville, SC (US); Theodore Wecker, Durango, CO (US); Jeremy Nigh, Greer, SC (US); Andrew Barringer, Duncan, SC (US)

(73) Assignee: Virtual Connect Technologies, Inc., Greenville, SC (US)

( * ) Notice: Subject to any disclaimer, the term of this patent is extended or adjusted under 35 U.S.C. 154(b) by 0 days.

(21) Appl. No.: 18/544,885

(22) Filed: Dec. 19, 2023

(65) Prior Publication Data

US 2024/0214336 A1     Jun. 27, 2024

Related U.S. Application Data

(63) Continuation-in-part of application No. 18/230,647, filed on Aug. 6, 2023, and a continuation-in-part of application No. 18/362,891, filed on Jul. 31, 2023, and a continuation-in-part of application No. 18/262,875, filed on Jul. 25, 2023, and a continuation-in-part of application No. 18/336,229, filed on Jun. 16, 2023, now Pat. No. 12,556,409.

(60) Provisional application No. 63/398,127, filed on Aug. 15, 2022, provisional application No. 63/398,142, filed on Aug. 15, 2022, provisional application No.

(Continued)

(51) Int. Cl.
H04L 51/063      (2022.01)
H04L 51/10       (2022.01)

H04L 51/18       (2022.01)
H04L 51/48       (2022.01)

(52) U.S. Cl.
CPC ............ H04L 51/063 (2013.01); H04L 51/10 (2013.01); H04L 51/18 (2013.01); H04L 51/48 (2022.05)

(58) Field of Classification Search
CPC ....... H04L 51/063; H04L 51/10; H04L 51/18; H04L 51/48; G06Q 10/107
See application file for complete search history.

(56) References Cited

U.S. PATENT DOCUMENTS 7,634,810 B2    12/2009  Goodman et al.
8,145,718 B1 *   3/2012  Kacker ................. H04L 63/126
                                                      713/153
9,501,746 B2    11/2016  Prakash
                            (Continued)

*Primary Examiner* — Johnny B Aguiar
(74) *Attorney, Agent, or Firm* — Kim and Lahey Law Firm, LLC; Douglas William Kim

(57)                    ABSTRACT

An electronic message visual indicator system comprising: a gateway computer system in communications with a message transport system adapted to receive an original incoming electronic message from a sender message system prior to the original incoming electronic message extending into a perimeter of a recipient message system, analyze the original incoming electronic message according to a set of warning criteria, add a link to an image that can be placed in the incoming electronic message to provide a modified incoming electronic message; and, a recipient message system is adapted to receive the modified incoming electronic message, retrieve an image from an image server according to the modified incoming electronic message and display the image providing an image that can be dynamically changed.

20 Claims, 6 Drawing Sheets

Related U.S. Application Data

63/398,132, filed on Aug. 15, 2022, provisional application No. 63/398,137, filed on Aug. 15, 2022.

(56) References Cited

U.S. PATENT DOCUMENTS

| | | | |
|---|---|---|---|
| 9,686,308 B1 | 6/2017 | Srivastava | |
| 10,181,957 B2 | 1/2019 | Srivastava | |
| 2003/0200268 A1* | 10/2003 | Morris | H04N 1/00164 |
| | | | 709/206 |
| 2012/0284347 A1* | 11/2012 | Cohen | H04L 51/066 |
| | | | 709/206 |
| 2019/0058727 A1* | 2/2019 | Kennedy | H04L 61/5007 |
| 2019/0356623 A1* | 11/2019 | Everton | H04L 51/23 |
| 2020/0127957 A1* | 4/2020 | Monberg | H04L 51/18 |
| 2022/0150199 A1* | 5/2022 | Ciancio-Bunch | G06Q 10/107 |
| 2022/0353218 A1* | 11/2022 | Beeman | G06Q 30/0276 |

* cited by examiner

COMPUTERIZED SYSTEM FOR DYNAMIC IMAGE INCLUSION IN AN ELECTRONIC MESSAGE

RELATED APPLICATIONS

This application claims priority from U.S. patent application Ser. No. 18/362,875 filed Jul. 31, 2023 which is a non-provisional application claiming priority from Provisional U.S. Patent Applications 63/398,127; 63/398,132; 63/398,137; and 63/398,142 all filed Aug. 15, 2022.

BACKGROUND OF THE INVENTION

1) Field of the Invention

This system is directed to a computerized system for dynamic image inclusion in an electronic message wherein the system can insert and associate a image pointer into an electronic message, such as an email, wherein the image is not be displayed until the electronic message is opened using a recipient's client.

2) Description of the Related Art

The use of electronic message, especially email, is prevalent today. Unfortunately, there is also an increased risk when using electronic messages due to undesirable and illegal activity from bad actors. For security and other reasons, knowing the status of a message at any given time would be advantageous, especially when that status can be provided prior to the electronic message entering the recipients electronic messaging system. Further, a visual representation of the status would also be advantageous as visual information is typically received and processed by the user much faster than plain text.

For example, it is known that an email having a link may have increased risks, especially one that is from an unknown sender. Some of the risks include what is called phishing where hackers attempt to cause the recipient to click on a malicious link where the link leads to a "fake" website designed to capture personal information or install malware on your device. Links can also result in downloading and installing malware on your computer or device that can gather and retrieve your data, monitor your online activities, even take control of your device, and access your login credentials or financial information. Other links can initiate email-based attacks including sending spam or malicious emails to others from your account causing reputational harm, being flagged as a spammer, or having the ability to use the email account revoked. Links can also result in a "drive-by download" which is where malicious code is automatically downloaded and executed on your device without your consent. Therefore, links in an electronic message carry significant risk. It would be advantageous to have a system that could quickly and visually indicate to the recipient that an incoming electronic message included a link, was from an unknown sender, from a source that has been previously identified as having spam or other undesirable activity, or the like.

However, there are technological challenges with using a visual indicator since there is a technique used by bad actors to attempt to have unsuspecting users click links; to embed images in electronic messages. An image can disguise undesirable links in the electronic message seeking to have the recipient open the image thereby activating (e.g., opening) the link. Images can include hidden malware, exploitive code, direct the recipient to a counterfeit login page or form (e.g., steganography). An image can also contain a tracking pixel that can let the hacker know that the email address is active. In response to these threats, electronic message systems can include a feature to block images. The ability to securely add an image to an electronic message that is secured and controlled would be advantageous and an improvement of the current technology.

Currently, the use of images by bad actors (e.g., hackers) for undesirable activities creates a significant problem in industry and technology. However, having a secure and controlled visual indicator that is easily seen would be advantageous to communicate information about the electronic message. Further, if the visual indicator could be modified to represent changes in the status, other information of the visual indicator would be advantageous. Visual information has been reported to provide the human brain can get the sense of a visual scene in less than $\frac{1}{10}$ of a second, processed images sixty thousand times (60,000) faster than text and that 90% of information transmitted to the human brain is visual. It is advantageous to use images (e.g., visual information) in communications including electronic message because recipients are naturally drawn to visual content as it can invoke emotions and convey messages more effectively than text. Further, an image can allow for highlighted information and communications to be more efficient, improve the success of a call to action since the call to action can be more easily highlighted, and are more easily understood on smaller screens such as smart phones and tablets. It would be advantageous to provide images in electronic messages while reducing or eliminating the traditional risks associated with images without having to block the images from the electronic message.

In the billions of emails that are sent per day, uses include personal communications, business communications, marketing, advertising, multi-party communications, collaboration, transmitting attachments, document or any other information interactions, and many other uses. Because of its increased use as well as the increase in security risks with modern communications, a system that can provide visual information, resulting in more effective information communication, would be advantageous. This is especially true when visual information is used to reduce or eliminate some of the current and future privacy and security risks. As the volume of emails increases, this improvement to the current technology becomes even more important.

Email provides the ability to have very fast delivery of information from remote geographic location, can be sent and received 24 hours a day, 365 days a year, can be accessed with any computer system using cloud-based system so that personal devices are not required, are inexpensive and can be a one to one or one to many distributions. One study found that the number of business emails sent and received per user per day totals 122 emails per day in 2015 and projected to be 126 emails per day in 2019. Further it is reported that 40 emails a day require a response. With this daily volume, the ability to manage emails, review and properly respond is a management task where automation could be a benefit.

The current technology can greatly benefit from a system that utilizes the benefits of visual information communication while reducing or eliminating the risks associated with images in electronic messages. Further, the ability of a system to insert images after the electronic message system has analyzed or otherwise acted upon the electronic message (e.g., stripping out images) would be advantageous. Further, the current technology would greatly benefit from the ability of the visual indicator to be modified according to a change in the status of the electronic message.

There have been attempts to automatically filter or identify undesirable electronic messages such as shown in U.S. Pat. No. 9,501,746 which discloses a system related to detecting bad actors who impersonate other people's identity in order to increase the likelihood of recipients opening these bad actors' messages and attachments. This patent states that this undesirable activity is generally referred to as "phishing" and specifically "spear phishing" when the recipient is targeted by the fake sender who is referred to as a "phisher". This patent also states that these phishers send these "fake emails" seeking to increase their likelihood of successfully gaining unauthorized access to confidential data, trade secrets, state secrets, military information, and other information. The motivation of these phishers is typically for financial gain through fraud, identity theft and/or data theft as well as those which wish to disrupt normal operations. Phishing attempts have been associated with private entities as well as being state sponsored and even foreign governments themselves. It would be desirable to have a system that can reduce or eliminate the risks of such undesirable activity by intercepting electronic messages prior to the electronic message being received by the recipient. A system that can quickly identify an electronic message that has higher risks than others would be advantageous, especially if this information can be communicated quickly such as by providing visual indicators that can be modified according to the status of the electronic message.

One attempt to detect and/or handle targeted attacks is shown in U.S. Pat. Nos. 9,686,308 and 10,181,957 which disclose a system for detecting and/or handling target attacks in an enterprise's email channel. This patent discloses receiving aspects of an incoming electronic messages addressed to a first email account holder, selecting a recipient interaction profile and/or a sender profile from a plurality of predetermined profiles stored in a memory, determining a message trust rating associated with the incoming email message based upon the incoming email message and the selected recipient interaction profile and/or the sender profile; and generating an alert identifying the incoming email message as including a security risk based upon the determined message trust rating. A system that can visually provide potential risks would be an improvement over the current technology.

Typically, an attempt to reduce email risks includes an "after-the-fact" designed to react to phishing attempts which is shown in U.S. Pat. No. 7,634,810. This patent discloses a phishing detection module that detects a phishing attack in communication by determining if the domain of the message source is similar to a known phishing domain, or by detecting suspicious network properties of the domain. This attempt requires that information about the message domain is known allowing bad actors to simply change domains to overcome this system. To visually provide the geographic origin of the electronic message would be advantageous.

Unfortunately, the historical activities such as subscribing to a spam filter are no longer sufficient and a more sophisticated approach is needed. One strategy is to develop a layered approach which should include preventive measures at the perimeter and not just once the email arrives in the inbox or email system.

Electronic messages, including email, can include header information that is used for various aspects of the management of the email. An email header is a collection of metadata that can include information about the travel path of the email from the origination to the recipient. It can also include information about email security, the sender, the IP address, and other information. The protocols that govern the sending and receipt of emails can be defined by Simple Mail Transfer Protocol, Post Office Protocol and Internet Message Access Protocol that are commonly used. However, each protocol has its limitations so that the ability to provide customization and actions on an email prior to it being received at the email system is limited. Further, the user, using one or more of these protocols, has a limited number of commands that can be accessed.

In some implementations, electronic message systems act on an electronic message (e.g., email) according to its contents and other rules that are based on the email or its header information. What is not present in the prior art is the ability to modify a visual indicator according to changes in the email or its header information and represent these changes visually (e.g., graphically) even after the electronic message has been delivered to the recipient's inbox.

Therefore, it is an object of the system to provide for a system that can provide a visual indicator that represents the status, attributes and other information associated with the electronic message.

It is another object of the system to allow for an image to be inserted or associated with the message after the electronic message enters the recipient's message system.

It is another object of the system to provide a system that can modify an image that is in an electronic message even after it is received by the recipient.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail. The following abbreviations/acronyms are used within this application: internet protocol ("IP"), domainkeys identified mail ("DKIM"), software as a service ("SaaS"). simple mail transfer protocol ("SMTP"), sender policy framework ("SPF"), domain-based message authentication reporting and conformance ("DMARC"), transport layer security ("TLS"), mail exchange ("MX"), domain name system ("DNS"), hypertext transfer protocol secure ("HTTPS"), multipurpose internet mail extensions ("MIME"), messaging application programming interface ("mapi"), and application programming interface ("API").

Figures 1, 2:
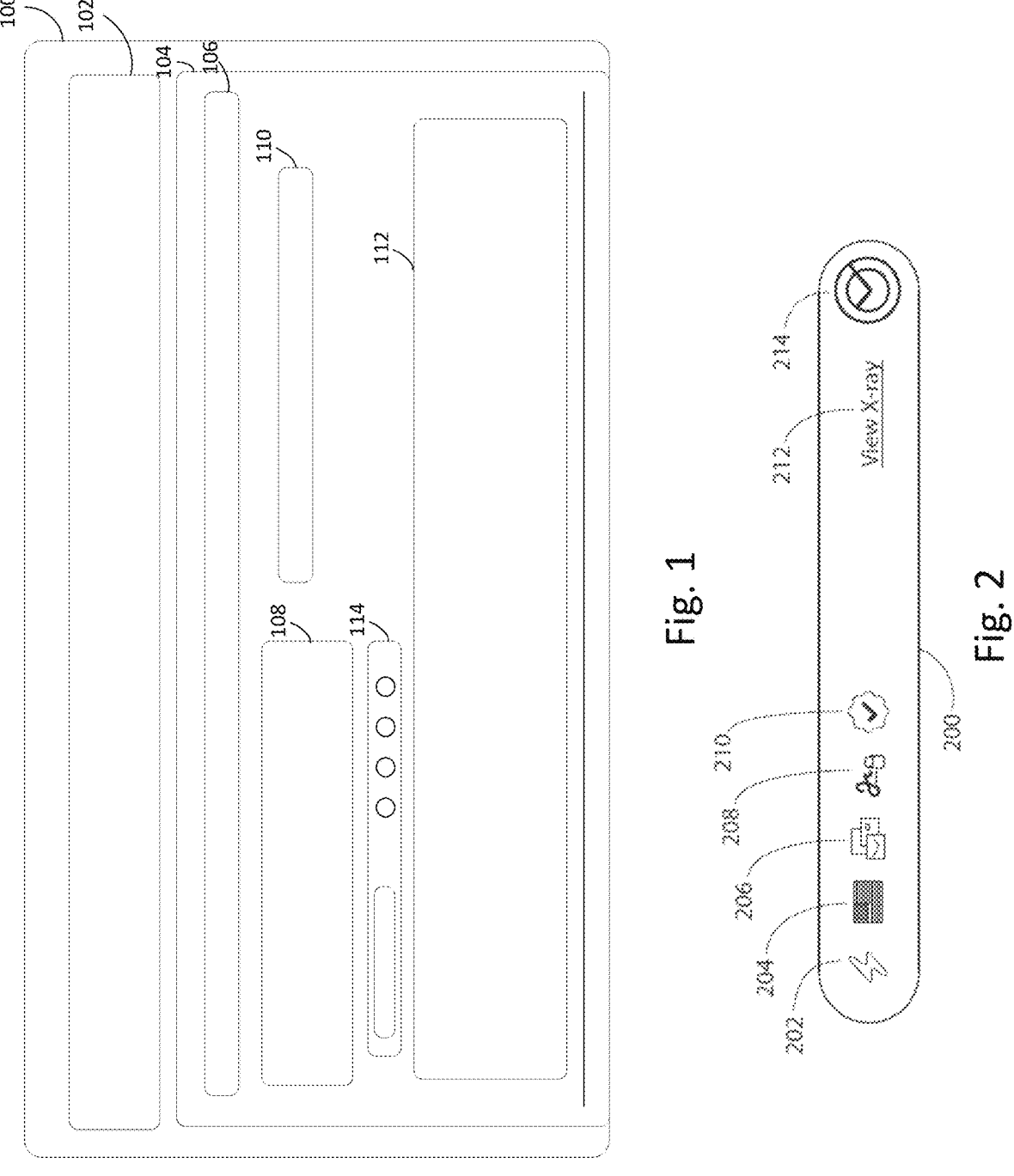
FIG. 1 is a schematic of aspects of the system.
FIG. 2 is a schematic of aspects of the system.

Referring to FIG. 1, an exemplary electronic message client 100 is shown. The message client can include a ribbon 102 that can have options and tasks that can be associated with electronic message such as delete, forward, reply, and the like. The electronic message (e.g., email) 104 displayed and provided to a user (e.g., recipient) can include a subject line 106, sender and recipient information 108 and additional information including the subject line, and additional actions that can be taken using buttons or other elements 110. The message can include text 112 and one or more images 114.

Using an email as an example, the images can include information related to the email itself. For example, the image can include graphic indicators that the email was sent, delivered, rejected, failed, blocked, quarantined, unread, read, spam, security risk, and other statuses associated with the email. For example, FIG. 2, shows an image bar 200 that can include icons or other visual indicators that relate to the status or attributes of the electronic message. In this example, a lightning bolt 202 can indicate that the electronic message is to be delivered immediately to the inbox. Flag 204 can represent the geographic origin of the electronic message. The bulk email icon 206 can indicate this is bulk or possibly an unwanted electronic message and can also be color coded so that a first color represents a certain level of risk while a second color represents increased risk. For example, a yellow color can indicate that there is a warning associated with an electronic message that could be a medium risk while red could mean heightened risk. A valid digital signature indicator 208, such as a signature with lock (e.g., DKIM signature) can be included. Seal 210 can indicate that the electronic message originates from a valid source (e.g., sender policy framework or domain-based message authentication, reporting, and conformance). The view X-ray link 212 can provide access to an information page that includes more detail than provided in the image bar 200. This indicator can provide information in the same or separate page and be shown the attributes such as those in lines (1) through (15) and Table 1 below. Shield indicator 214 can be used to show the brand or logo or other representation of the vendor or source that can provide these features, functions, and processes.

Figure 3A:
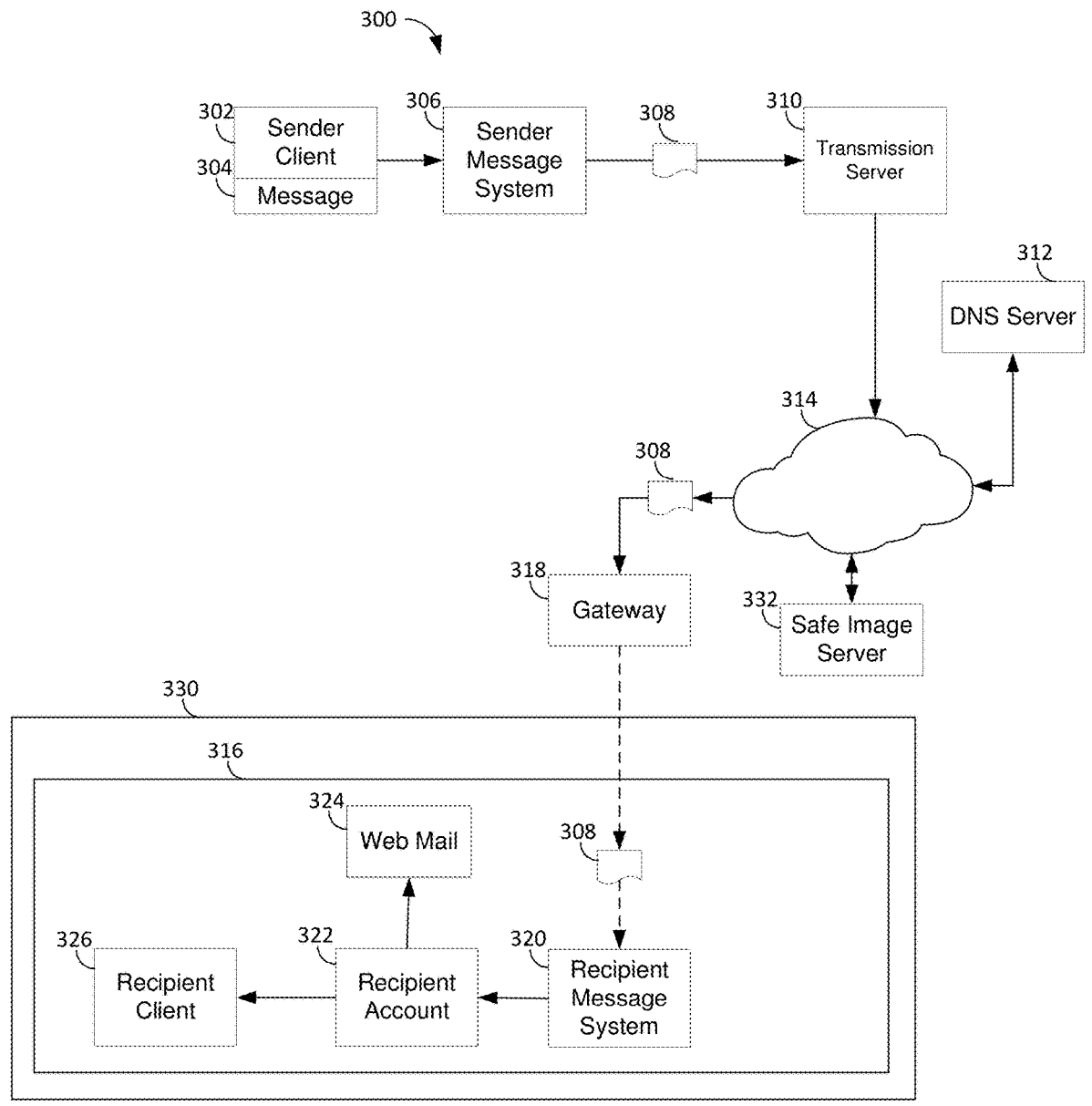
FIG. 3A is a schematic of aspects of the system.
Figure 3B:
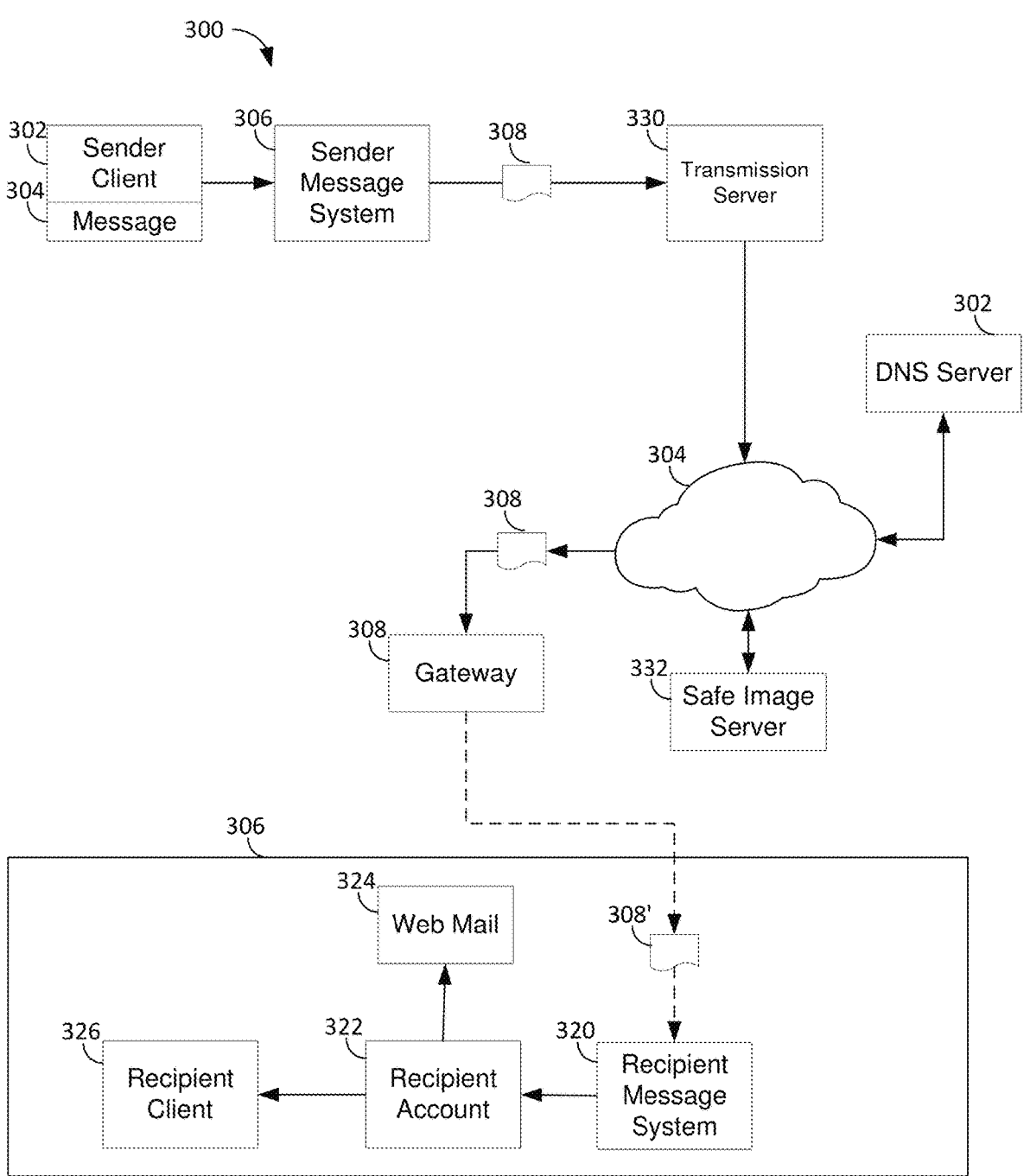
FIGS. 3B and 3C are schematics of aspects of the system.
Figure 3C:
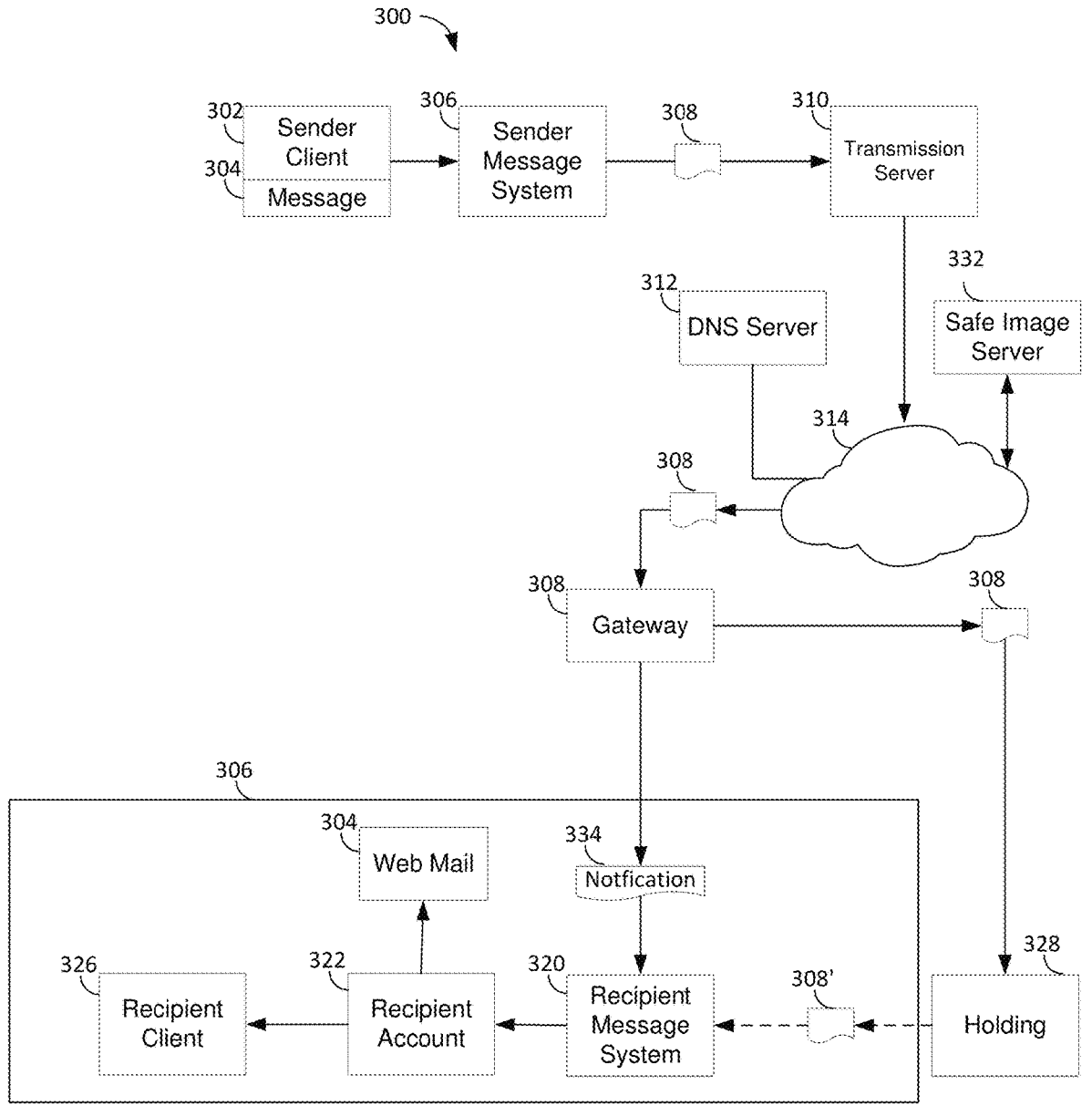

Referring to FIGS. 3A through 3C, and using an email system as an example, the electronic message communications process is shown generally as 300. The sender device 302 can be used to create a message 304. The message can be created by an individual author (e.g., human) or an automated system. The sender client can be local, web based, or can be accessed through SaaS (e.g., cloud based). The sender message system 306 can then transmit a message 308 to one or more transmission servers 310, such as a SMTP server, and then directed to a destination by a domain name system (DNS) 312. The DNS can provide information about where to send the electronic message through a global communications network 314. The electronic message 308 can then be transmitted toward a recipient domain 316. Prior to the message arriving at the recipient's message system 320, the message can be intercepted by a gateway service 318. The gateway service can be located outside the recipient message system domain 330 of the recipient message system so that these incoming messages may be acted upon prior to arriving at the recipient's message system. By intercepting the incoming message outside the perimeter, the message can be analyzed or otherwise managed thereby reducing or eliminating the risk of a malicious incoming message impacting the recipient's message system.

For example, assume that a bad actor is attempting to use an email that includes an image, and that image may have undesirable links or other undesirable or malicious code. The image could be used to redirect users to malicious sites, download files, execute code, or to even display phishing forms locally within the browser. Were a user to activate such an image, the damage can be done. Determining that there is a risk prior to the malicious image being delivered to the recipient's message system is one of the benefits of the present system in that such an image can be removed from the email prior to the email being sent to the recipient message system. Therefore, the email could arrive at the recipient's message system without images.

In order to have the incoming message display an image to the user, prior to entering the perimeter of the recipient's message system 330 a link to an image can be added to the electronic message prior by the gateway server. When the email arrives at the recipient's inbox, the link can be used to retrieve the image from a safe image server 332 and the image displayed to the recipient. The safe image server can also generate images according to the attributes of the email so that the recipient is provided with real time information about that email.

This allows the electronic message to have a link to visual information added to the email prior to the message entering the recipient's perimeter and especially prior to being received by the recipient's message system and in the recipient's inbox without images being in the email.

When the message is received by the gateway, the computer readable instructions on the gateway system can determine that a link to an image is needed and add the link to the message to provide message 308'. The modification can include modification to the header information and metadata resulting in the modified message 308' that can include a link to an image on the safe image server.

In one embodiment, the message can be identified as spam, a security risk, or other undesirable status and not sent to the recipient message system. In this case, the message can be modified to include the image link and then transmitted to a holding area 328 such as a quarantine area that can be inside or outside the recipient's message system perimeter. A notification 334 can be sent to the recipient that informs the recipient that the message was intercepted and placed on the holding area. The recipient can view the message, including the image retrieved by the link and provide a release instruction. The recipient or the recipient's message system can communicate with the gateway and can provide a release communication representing a request of the recipient or recipient's message system to allow the message to be released from the holding area and transmitted to the recipient's message system. In one embodiment, an action can be taken on the message by the recipient's message system prior to delivering the message to the recipient's message system such as converting the message to text, removing links, removing previous added images and the like designed to reduce the risk of the message including malicious elements. The message can be modified from message 308 to message 308' prior to being sent to the recipient's message system in one embedment. The modifications can be performed by the gateway server in response to the attributes of the email and/or the information that is included in the image itself.

Figure 4:
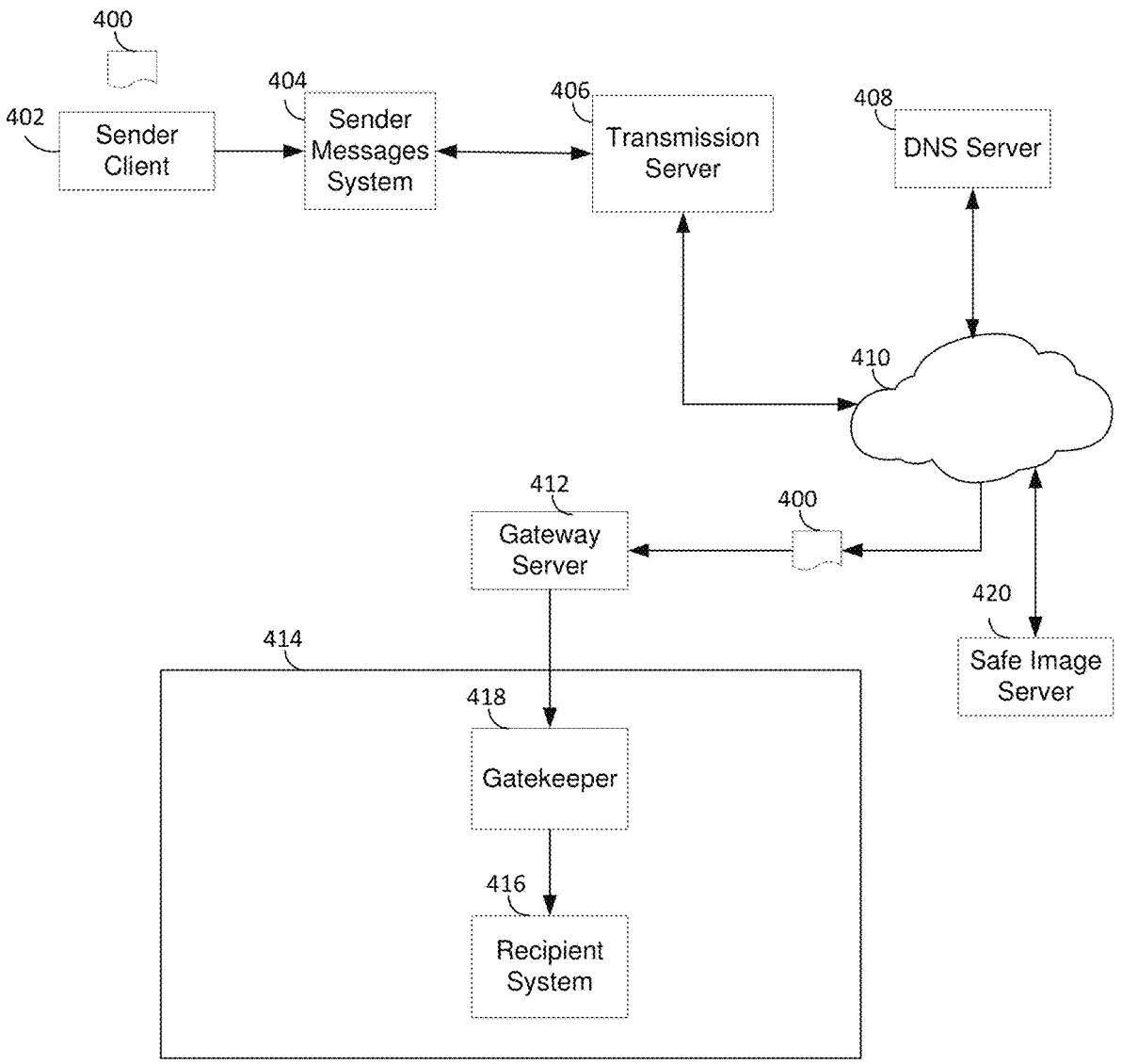
FIG. 4 is a schematic of aspects of the system.

Referring to FIG. 4, message 400, either manually generated or automatically generated, can be created by a sender client 402 that is in communications with a sender message system 404. In one embodiment, the message can be transmitted by the sender message system to one or more transmission servers 406 as is typical with electronic message systems. The header information of message 400 can include information such as the identification of the sender, sender message server, one or more transmissions (or intermediate) servers and the like. Based upon the recipient, a DNS service 408 can determine a route along a communications network 410 for the message 400 to travel including a global communications network. As the message travels, such as with email, the message and its header can have information appended to it including items such as SPF, DKIM and DMARC authentication results, spam filter information, and more. This information can be referred to as "X-headers" and can includes information related to processing of the message and its transmission. Due to the nature of some electronic communications, these systems that add X-headers, can be proprietary systems and may not adhere to industry or even widely accepted standardizations.

The gateway system 412 can use a database, information from the recipient message system, information from the message itself, information from third parties, or other information to determine what risk or modifications need to be made to the message. An image link can be added to the message that can be used to retrieve an image that can be displayed to the recipient safely embedded in the email. The image can indicate the risks that may be associated with the email and can include the potential for the email to contain spam, originate from a malicious sender, indicate attached code or imbedded links, and the like. By marking the message, rather than taking action at the gateway level, the performance of the system can be improved as the message can have additional header information added without unnecessary processing or input from the recipient. Further, the gateway system can modify messages with links without requiring images to be in the email. By retrieving the images from the safe image server, the image can be updated as the attributes of the email change. For example, if the original email originated from a sender that was believed to be a trusted sender and as a later date the sender was found not to be trusted, the image can be updated and displayed even after the email was placed in the recipient's inbox.

When the message is intercepted, it can be modified with the image link to point to an image on the safe image server 420. The link can retrieve the image and information displayed with the email and the image can be generated by information gathered from the gateway system 412, email 400 itself, sender systems 402 and/or 404, transmission servers 406, DNS servers 408, safe image server 420, gatekeeper 418, recipient system 416 and the recipient client. The message can then be passed into the recipient's perimeter 414 and to the recipient message system 416.

The recipient's message system can include a gatekeep service 418 that includes computer readable instructions that allow the gatekeep service to receive the message within the recipient's perimeter 414, analyze the message including any modification to the message, and perform certain actions. These actions can include transmitting or allowing the safe image server to access information to generate the image that is linked to in the email. The gatekeep service 416 (which from time to time is also referred to as the gatekeeper) can receive electronic messages, retrieve the header information, and make a determination as to the next action to take concerning the electronic message. Therefore, action taken on a message can be determined at the enterprise level as well as the user level.

For example, gatekeep service 418 may determine that the sender is a blocked sender, and this information can be used to generate the image. The gatekeeper can also determine the IP address of the sender and determine, according to the IP address, what information to provide to the safe image server. For example, if the IP address of the sender is associated with a known source of spam, the image could indicate so. In this case, the gateway service may also determine not to send the message to the recipient message server. This action can be taken for all messages to users or for only some of the users that have blocked that IP address.

The gateway system 412 can also edit the header information to add the link to the image. The image can be used as one or more triggers which could result from any number of determinations of the gatekeeper 412, but since the image information is being modified, the gateway system does not actually have to take action according to the trigger and the trigger is simply associated with the electronic message. The trigger can be associated with the electronic message by editing the header information, adding information to the electronic message subject, adding information to the electronic message contact, adding an attachment and any combination thereof. Therefore, in one embodiment, the gateway system is amending the electronic message, including amending its header information, so that subsequent action could be taken, but does not necessarily have to be taken. This structure provides increased functionality and even security for existing electronic message systems that would not otherwise be possible. The gatekeep service can be implemented with a recipient's message server using an application programming interface.

During the process of creating the electronic message (e.g., email), transmitting the message and receiving a reply, each message results in header information that can include any number of items. By way of illustration, an email header can include the following:

TABLE 1

| | |
|---|---|
| Received: from CY4PR2201MB1384.namprd22.prod.outlook.com (2603:10b6:910:6a::22) by SN4PR22MB2902.namprd22.prod.outlook.com with HTTPS; Tue, 28 Jun 2022 14:55:33 +0000 | (1) |
| Received: from MW2NAM04FT012.eop-NAM04.prod.protection.outlook.com (2603:10b6:303:2a:cafe::2) by MW3PR06CA0018.outlook.office365.com (2603:10b6:303:2a::23) with Microsoft SMTP Server (version=TLS1_2, cipher=TLS_ECDHE_RSA_WITH_AES_256_GCM_SHA384) id 15.20.5373.16 via Frontend Transport; Tue, 28 Jun 2022 14:55:31 +0000> | (2) |
| Received: from otransport-12.outbound.emailsrv.net (52.1.62.31) by MW2NAM04FT012.mail.protection.outlook.com (10.13.31.127) with Microsoft SMTP Server (version=TLS1_2, cipher=TLS_ECDHE_RSA_WITH_AES_256_GCM_SHA384) id 15.20.5373.15 via Frontend Transport; Tue, 28 Jun 2022 14:55:31 +0000 | (3) |
| Received: from NAM10-MW2-obe.outbound.protection.outlook.com (mail-mw2nam10lp2106.outbound.protection.outlook.com [104.47.55.106]) by ogate-3.outbound.emailservice.io (Postfix) with ESMTPS id D2D80A966C for <doug@kimandlahey.com>; Tue, 28 Jun 2022 14:55:29 +0000 (UTC) | (4) |

TABLE 1-continued

```
DKIM-Signature: v=1; a=rsa-sha256; c=relaxed/relaxed;          (7)
d=Mailprotector.onmicrosoft.com; s=selector2-Mailprotector-onmicrosoft-
com;
h=From:Date:Subject:Message-ID:Content-Type:MIME-Version:X-MS-
Exchange-SenderADCheck;
bh=CN+f5XFwlaGaTKhNrulNut5x70E5mnx3t4xVI+4qvkQ=;
Received: from DM4PR19MB5761.namprd19.prod.outlook.com          (8)
(2603:10b6:8:60::17) by BN0PR19MB5278.namprd19.prod.outlook.com
(2603:10b6:408:151::17) with Microsoft SMTP Server (version=TLS1_2,
cipher=TLS_ECDHE_RSA_WITH_AES_256_GCM_SHA384) id
15.20.5373.18; Tue, 28 Jun 2022 14:55:26 +0000
Received: from DM4PR19MB5761.namprd19.prod.outlook.com          (9)
([fe80::d447:8c8:3b5c:1119]) by
DM4PR19MB5761.namprd19.prod.outlook.com
([fe80::d447:8c8:3b5c:1119%9]) with mapi id 15.20.5373.018;
Tue, 28 Jun 2022 14:55:26 +0000
From: Ben Hathaway <ben.hathaway@mailprotector.com>            (10)
To: Douglas Kim <doug@kimandlahey.com>
CC: David Setzer <david.setzer@mailprotector.com>
Subject: Re: Radar Patent and Trademark(s)
Thread-Topic: Radar Patent and Trademark(s)
Thread-Index:
AQHYiiN1/xI9gZsj6EuDAE8S5xw5nq1k0sUAgAAKU4CAAAbpgIAABesA
Date: Tue, 28 Jun 2022 14:55:26 +0000
Message-ID: <4397EC37-3901-4122-AE57-
28305CF8B2F7@mailprotector.com>
In-Reply-To:                                                   (11)
<SN4PR22MB2902782099AD395EA9F4382ED1B89@SN4PR22MB2902.
namprd22.prod.outlook.com>
Accept-Language: en-US
Content-Language: en-US
X-MS-Has-Attach:
X-MS-TNEF-Correlator:
Authentication-Results-Original:
dkim=none (message not signed)
header.d=none;
dmarc=none action=none
header.from=mailprotector.com;
spf=none;
X-Microsoft-Antispam-Message-Info-Original:                    (12)
zzKZNSEnd7Z8oihwEWwkiQF6Pvi6TIIIobQXfo7PWxoDRY9M29iCAY3Yr
P9cnFYiGy0Uf0DB7HPRnb0pAMo8KEIVS7yw1YNCJY9KfDuMkpcD5u8T
z/gvvN+fXS/liXZZFGMQQ9w/GCm4PZBsEQJ7vF2h7wWaMVWdK9BzkW
5uJMxBqFyRsKeHMDOJmq+HdCAfUcQH0qJegXbkoXBFiVqICIL787luOh
6LGcx3N28FaW/WycZlpTKTq54CQjUU99JaMPpdVWfxh7Qz4Zv35CQ3P
qwgODUGasTYdM9BYxULY1aPyYBtvTKyrkJqOrX/6EIEAndqS5MvDKDP
5xBT26zl3vy+E+s87XLW5/VZNUilgclqLKQAOYuDYPugHVZG4ENwy97it
1eEb4Jblz4eu0HXtCRtl9uv40mr3/m/YV8iexZtnP21bNUG85n82JVrbBwz7
W6kS/g3FVzOSIrFncs1ARF8trPLOiLxIBUQ4NNzSWohQhwRg8cm2fPOrz
iSv581/TtA3NWdJ+trW8BDJjfuHDzWY/bL4vmZhU9h7uNw7fAsmW+sdtniE
yaKeenYPrOdwBShlbfqQ42vHNag+EH/xLjUCBDcZjUlCeLelitPBHffoDtca
GtIVBE2zqkXWvYBJ5tXUrpZ3vG7PdE8ejtv41yNku1Oc2NrvZIFt2J2/w5Ub
t80msrQ4VB1X1IPrYFAGjZW8incjFwCXEMjg40C5+UioHpWhk+dq9/v0B
MgSZhdmknhcVAGW4fxLkd2/ufjMYsc07/P+B9qrmT6fuNIv2mkL4KROvs0
IQwAoq38dyvbmreofMFbrwVizdWArpDGaNnrxqlpllhcLSzpOxA4Qiin/AT/r
wjFGI+y1t9XIMe68iAAqORjrw9zbMG03+PBWJ9fFwZdNpZeWeeB+73uH
dRA8hm1uhiezKsM4PVOUSU=
```

From an analysis of the information for this email header, it can be seen that the DMARC=none action-none as shown in line (13). This indicates that DMARC is not present and that the gatekeeper (or application programming interface of the functionality of the gatekeeper in the recipient message server) should take no action. This information is designed to be used by a DMARC policy as determines what could be done with a non-compliance electronic message. The limitation on this structure is that the option for a non-compliance electronic message for the DMARC structure is to either take no action, quarantine, or reject the message. When the setting is "quarantined", the electronic message is accepted, and the recipients message system determines what actions to take. The image can indicate that this risk is present and allow the user to decide to send the electronic message to a spam folder.

The use of the gatekeeper 418 can improve the technology since it does not require that the recipient message system that hosts the recipient's mailbox take the action (e.g., that the message is not already in the inbox). The gatekeeper may also temporarily quarantine the message and inform the recipient that the message was quarantined. This allows the recipient to review the message and determine if a further step is needed. The gatekeeper can also treat the message as spam and prevent the message from being received.

The computer readable instructions of the present system can greatly increase the functionality of such technologies as DMARC and provide additional information allowing the recipient's message server to have more sophisticated actions and improve the security of incoming messages. For example, the header information originally can state "DMARC=none action=none". In this case, the gateway service can review the electronic message header and recognize that the sender's IP address is a known spam source and modify the electronic message system to include "DMARC=none action=quarantine". Therefore, when the message is delivered to the gatekeeper, the gatekeeper can act on the trigger (e.g., action=quarantine) and place the message in the spam folder even regardless of the actual DMARC analysis. The gateway service can take advantage of the existing DMARC policies and be used to modify the image so that the DMARC polices are shown to the user even when the DMARC analysis results come in as "none."

The gateway system 412 can also be used to generate an image with unique information that is generated by the gateway system. For example, the gateway system could add a new line to the header as shown below:

$$reputation = neutral \; action = none. \quad (13)$$

Potential values for the reputation can include a numeric value such as 0-100 or a value selected from positive, neutral, and negative. The action value can be any number of information including blocked, spam, high volume, risk, and any combination. Once the electronic message is modified, can be transmitted into the perimeter of the recipient message server.

The recipient message server can be augmented, such as with an application programming interface (API) and can then retrieve the header information and take action according to recipient message server with default functionality or functionality added through the API; e.g., the gatekeeper. For example, if the header information includes "reputation=negative action=spam", the recipient message server can place the electronic message into a spam folder. In another example, if the header information includes "reputation=breach-risk action=delete", the recipient message server delete the message prior to the message being sent to the recipient message server.

Figure 5:
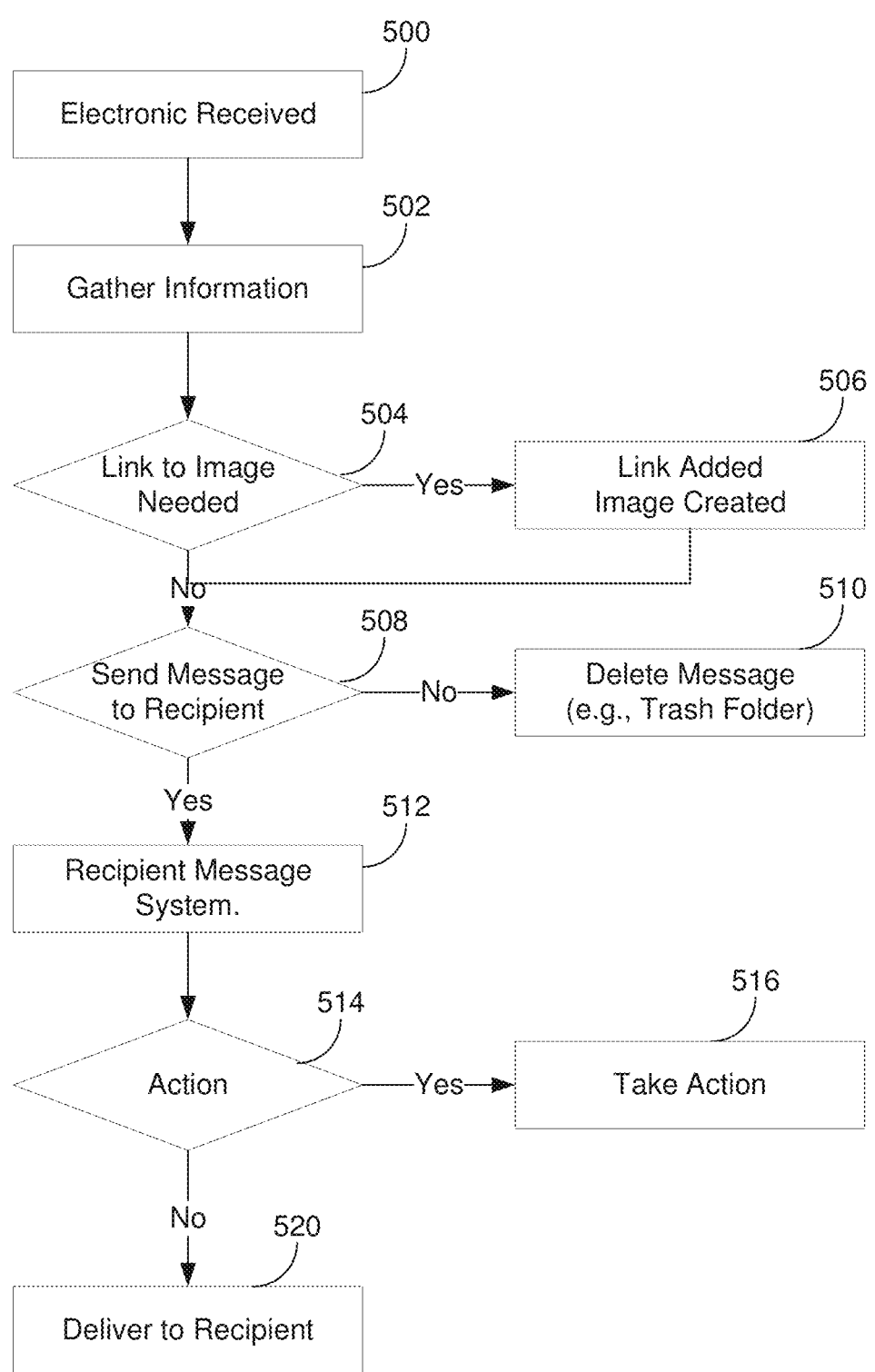
FIG. 5 is a flowchart of aspects of the system.

Referring to FIG. 5, the electronic message can be received at 500 by the gateway service or system (e.g., system). The gateway system can gather information at 502 about the electronic message and perform analysis on the electronic message that can include a TLS encryption analysis, a MX record exposure, a DKIM presence, a SPF presence, a DMARC presence, a reputational information, a reverse DNS lookup consistency, a tracking item, information concerning other users (e.g., did other users delete, move, not open, open or take other action on the same or similar electronic message) and any combination thereof and determine what trigger at 504 to modify or add to the message header. This information can be used to generate an image that can be retrieved and placed in the electronic message. The electronic message can be modified at 506 by the gateway system by having an image link placed in the email allowing so that the image can be retrieved from the safe image server and displayed with the electronic message. The gateway system can also determine if the message should be marked to be sent to the recipient message server at 508. In one embodiment, the gatekeeper system can determine whether the message should be deleted or otherwise disposed of at 510. The message can be transmitted to the recipient message system at 512. If the message is sent to the recipient message system, the gatekeeper and recipient's message system can determine if action should be taken at 514 according to its current policies and the information associated with the electronic message or which image should be initially created. Action can be taken at 516 by the user in response to viewing the image if it is delivered at 520.

In determining if the gatekeeper should either take action or the gateway should modify the electronic message (e.g., header), the gateway and gatekeeper can perform any number of analyses. For example, the gateway server can attempt to establish a TLS connection with the sender message system. In establishing these connections, the gateway service can analyze the connection, determine if it is a secure connection and can review the certificate for validity and expiration. If the TLS certificate is missing or expired, the gateway system can modify the electronic message according to indication the results of the analysis. For example, the header information can be amended to have the following:

$$TLS \; connection = present \; action = none. \quad (14)$$

This analysis can also apply to message system access using https and determine if the certificate associated with the https is present and valid.

The gateway system can determine if the "From address", the email or domain, has been blacklisted and modify the electronic message in the event that one or more of the domains in the travel path of the email are blacklisted. The following is an example of header modification.

$$blacklist = true \; action = delete \quad (15)$$

From the header information, the gateway system can determine if the DKIM record is aligned or not aligned. In this process, the gateway service can determine if the message is properly cryptographically signed and therefore can provide for authentication of a message. When the DKIM record is missing, the header can be amended to indicate that the DKIM record is missing and what action to take in such an event.

The gateway system can review the SPF record and determine if the SPF record is present and properly configured. In the example above, there is no SPF record and therefore the message header can be modified to so indicate. The SPF record can also be reviewed to determine if there are third party domain that can send emails on behalf of the organization associated with the email being sent.

The gateway system can review the IP associated with the sender's message and retrieve an IP reputation from an internal source associated with the gateway system or from a third-party provider. A negative reputation can result in the message, such as the header information, being modified accordingly. The gateway system can also perform a reverse DNS lookup using the IP address associated with the message. The IP address is used to determine the hostname associated with the sender's message. If there is no pointer record (PTR) then reverse DNS lookup cannot provide the hostname the message can be modified.

The gateway system can also use tracking in the message to determine characteristics associated with the message and any reply, for example, if an email has been opened, when, the location and the type of device that was used to read the email. The message can include a tracking pixel or other tracking item. The message can be modified to add the tracking item to the content of the message of the header can be modified to add tracking information that can trigger the recipient's system to transmit an open message. The image can be updated to represent these and other actions.

In one embodiment, the header information can include a security score. The security score can begin with an initial score and then when each analyzed item is determined, modifications to the security score can be made. For example, Table 1 illustrates potential modification to a security score that can be added to the header information:

TABLE 1

| Analyzed Item | | Deduction (points) |
|---|---|---|
| Received Email With (TLS) Encryption | No | −150 |
| Transmits Email With (TLS) Encryption | No | −150 |
| MX Record Exposes Email Host | Yes | −100 |
| DomainKeys Identified Mail (DKIM) used | No | −100 |
| Sender Policy Framework used | No | −100 |
| Domain/IP Reputation | Negative | −100 |
| Domain-based Message Authentication Reporting and Conformance (DMARC) used | No | −75 |
| Reverse DNS IP matches hostname | No | −50 |
| Spyware allowed | Yes | −25 |

When analyzing TLS encryption, the email address of the sender can include the email domain and a connection can be attempted. The presence of the TLS certificate can be made at 504 and if the TLS certificate is not present, the image can be created or modified to show that there is no TLS certificate and what action is recommended by the gateway service to the recipient message system. The validity of the certificate can include verification of the digital signature associated with the domain, analysis of the certification chain, including intermediate certificates, review of the expiration or activation dates of the TLS certificate, the revocation status of the certificate and any combination thereof.

The header information can also be used to determine the time that the message is generated, sent, received as well as when a reply is generated, sent and received, which can be included in the image. The gateway system can also determine information revealed by the MX record is shown. The domain name associated with the message can be used to retrieve the MX record(s) associated with the domain name. A determination is made if the MX record which, based upon its configuration, exposes the sender's origin IP address and if so, the IP address can be used for determining blocked lists, blacklisted, whitelists, geographic information, and any combination. The message can be analyzed to determine if there is a valid DKIM record. The gateway system can determine if there is a DKIM signature from the email header and if not, modify the message accordingly, such that the DKIM signature is not valid. Therefore, the gatekeeper and recipient message system can provide information that can be used to create or modify the image.

The message can be analyzed by the gateway system to determine if there is a SPF record that can be subject to look up and if not, the message can be amended to represent that the SPF record cannot be authenticated. The information revealed by the reverse DNS lookup can be determined by the gateway service. The IP address associated with the message can be determined. If the domain is not a valid domain, then the message can be modified to so indicate. Therefore, determinations and analysis of the message can occur at the perimeter prior to the message being transmitted to the recipient message system.

The gateway system can determine tracking information such as if the message includes a tracking item or if a tracking item has been or should be added. In one embodiment, the tracking information can be a tracking pixel, portion of an image or image that can be added to the email that is sent. The gateway system can determine that as preexisting tracking item is present and ne used to generate the image (e.g., have the image indicate that a tracking pixel is present).

The system described herein is directed to a series of acts that can protect a computer or computer system from electronic communication that may contain malicious code of other undesirable content. The computerized system is one that is at least directed to a process. The system can identify and potentially isolate electronic messages in an electronic message system according to the edge value and/or the confidence values. The edge value and confidence values associated with a sender or electronic message can be stored in a database that can be accessible by a second analytical computer system that does not have to be in direct communications with the first analytical computer system. The processes and procedures that are described herein can be actuated by a computer processor that executes computer readable instructions to provide the functionality herein.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. An electronic message system for managing malicious images in incoming electronic messages comprising:
   a gateway computer system in communications with a message transport system, wherein the gateway computer system is adapted to;
   receive an original incoming electronic message from a sender message system prior to the original incoming electronic message extending into a perimeter of a recipient message system, wherein the original incoming electronic message comprises an image;
   analyze the image according to a set of warning criteria to determine whether the image is potentially malicious;
   remove the image from the original incoming electronic message based on the determination that the image is potentially malicious;
   store the image on an image server;
   add a link to the image that is placed in the original incoming electronic message to provide a modified incoming electronic message; and
   transmit the modified incoming electronic message to the recipient message system;
   wherein the original incoming electronic message is received by the recipient message system, wherein the recipient message system receives the modified incoming electronic message, retrieves the image from the image server according to the modified incoming electronic message and displays the image; and wherein the gateway computer system is further adapted to;

reduce a risk of malicious image embedded in the incoming electronic messages; and allow the sender message system to use a standard email message system.

2. The electronic message system of claim 1 wherein the gateway computer system is outside the perimeter of the recipient's message system.

3. The electronic message system of claim 1 wherein the image is modified according to changes in an attribute associated with the modified incoming electronic message.

4. The electronic message system of claim 1 wherein the gateway computer system is included in the recipient's message system.

5. The electronic message system of claim 1 including a set of blocked internet protocol (IP) addresses and, wherein the gateway computer system adds a blocked IP address image indicator to the image when an IP address of the sender message system matches an entry in the set of blocked IP addresses.

6. The electronic message system of claim 1 including a set of blocked sender addresses and wherein the gateway computer system adds a blocked sender indicator to the image when a sender address matches an entry in the set of blocked sender addresses.

7. The electronic message system of claim 1 wherein the gateway computer system receives the original incoming electronic message prior to the recipient's message system according to an Mail Exchange record associated with the original incoming electronic message.

8. An electronic message system for managing malicious images in incoming electronic messages comprising:

a gateway computer system in communications with a message transport system, wherein the gateway computer system:

receives an original incoming electronic message from a sender message system prior to the original incoming electronic message extending into a perimeter of a recipient message system, wherein the original incoming electronic message comprises an image;

analyzes the image according to a set of warning criteria to determine whether the image is potentially malicious;

removes the image from the original incoming electronic message based on the determination that the image is potentially malicious;

stores the removed image electronic message on an image server; and adds an image link to the original incoming electronic message to provide a modified incoming electronic message, wherein the modified incoming message does not include the image, wherein the gateway computer system transmits the modified incoming electronic message to the recipient message system;

wherein the recipient message system receives the modified incoming electronic message, retrieves the image from the image server according to the image link and displays the modified incoming electronic message and the image to a recipient; and wherein the gateway computer system is adapted to:

reduce a risk of malicious image embedded in the incoming electronic messages; and allows the sender message system to use a standard email message system.

9. The electronic message system of claim 8 wherein the image is an indicator representing an attribute taken from a group consisting of information that the original incoming electronic message: has been transmitted, placed the original incoming electronic message in a holding area, deleted, originates from a risky source, and any combination thereof.

10. The electronic message system of claim 8 wherein the gateway computer system transmits the modified incoming electronic message to a holding area outside the perimeter of the recipient's message system.

11. The electronic message system of claim 10 wherein the gateway computer system transmits a notification to the recipient's message system representing the modified incoming electronic message being stored in a holding area outside the perimeter of the recipient message system.

12. The electronic message system of claim 8 wherein the gateway computer system modifies an indicator in the image.

13. An electronic message system for managing malicious images in incoming electronic messages comprising:

a gateway computer system in communications with a message transport system, wherein the gateway computer system is adapted to:

receive an original incoming electronic message from a standard sender message system prior to the original incoming electronic message extending into a perimeter of a recipient message system, wherein the original incoming electronic message comprises an image;

analyze the image according to a set of warning criteria to determine whether the image is potentially malicious;

remove the image from the original incoming electronic message based on the determination that the image is potentially malicious;

store the image on an image server;

add a link to the image that is placed in the original incoming electronic message to provide a modified incoming electronic message, wherein the modified incoming electronic message is retrieved by the recipient message system, wherein the recipient message system retrieves the image from the image server according to the modified incoming electronic message and displays the image to a recipient.

14. The electronic message system of claim 13 wherein the image is modified according to changes in an attribute associated with the modified incoming electronic message.

15. The electronic message system of claim 13 wherein the link is modified according to changes in an attribute associated with the modified incoming electronic message.

16. The electronic message system of claim 13 wherein the image represents an attribute of the original incoming electronic message taken from a group of graphic indicators consisting of representation that the original incoming electronic message was sent, delivered, rejected, failed, blocked, quarantined, unread, read, spam, security risk, and any combination thereof.

17. The electronic message system of claim 13 wherein the image represents an attribute of the modified incoming electronic message taken from a group of graphic indicators consisting of representations that the modified incoming electronic message was sent, delivered, rejected, failed, blocked, quarantined, unread, read, spam, security risk, and any combination thereof.

18. The electronic message system of claim 13 wherein the gateway computer system transmits a notification to the recipient's message system representing the modified incoming electronic message being stored in a holding area outside the perimeter of the recipient's message system.

19. The electronic message system of claim 13 wherein the gateway computer system transmits a notification to the recipient's message system representing the original incoming electronic message being stored in a holding area of the recipient's message system.

20. The electronic message system of claim 13 wherein the gateway computer system transmits a notification to the recipient's message system representing the modified incoming electronic message being stored in a holding area of the recipient's message system.

\* \* \* \* \*